Dec. 4, 1956　　　　E. A. STALKER　　　　2,772,852
ROTOR CONSTRUCTION FOR FLUID MACHINES

Filed Aug. 3, 1950　　　　　　　　　　　2 Sheets-Sheet 1

INVENTOR.
Edward A. Stalker

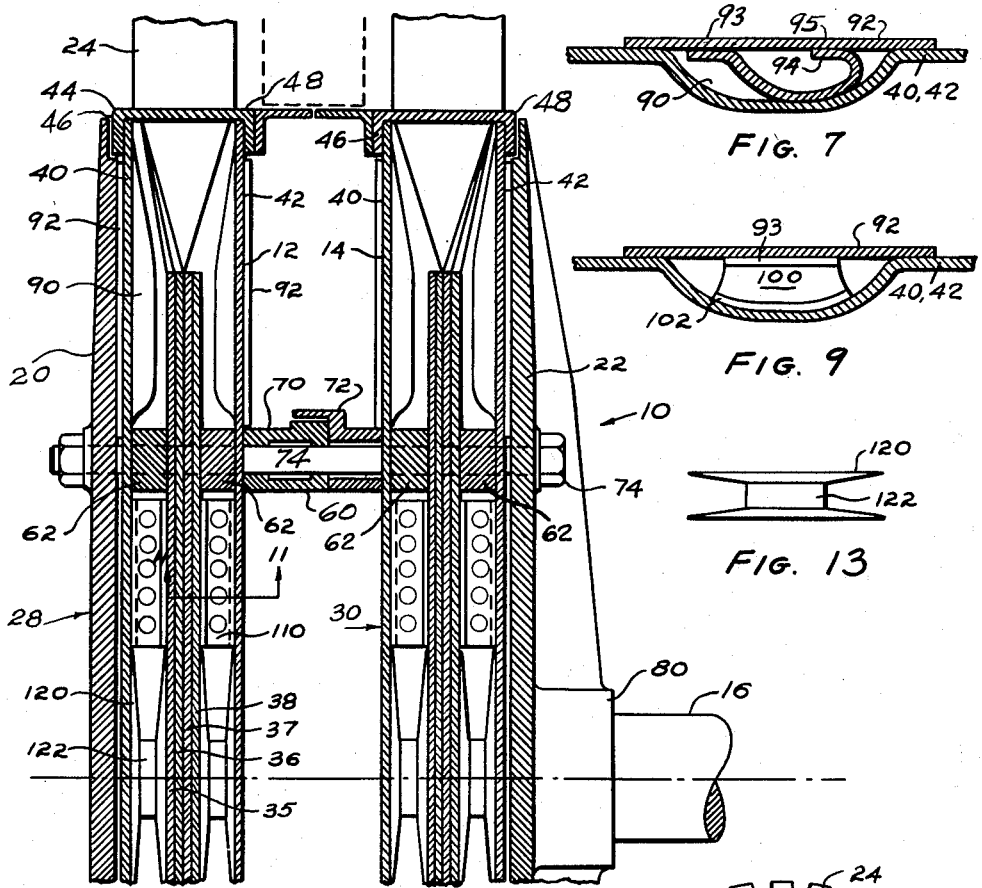

United States Patent Office 2,772,852
Patented Dec. 4, 1956

2,772,852

ROTOR CONSTRUCTION FOR FLUID MACHINES

Edward A. Stalker, Bay City, Mich., assignor to The Stalker Development Company, Bay City, Mich., a corporation of Michigan Application August 3, 1950, Serial No. 177,480

17 Claims. (Cl. 253—39)

This invention relates to rotor construction for compressor and turbine rotors and the like.

An object of the invention is to provide for sheet metal rotors, a means of assembling them in multi-stage arrangement.

Another object of the invention is to provide means of stabilizing the rotor against axial thrust.

Still another object is to provide means of damping the vibrations in the rotor hub.

The subject of rotors fabricated from sheet metal stampings or pressings has been treated in the following patent application: Axial Flow Compressor Construction, Serial No. 42,565, filed August 5, 1948, now Patent No. 2,649,243.

The above objects are accomplished by the means illustrated in the accompanying drawings in which—

Fig. 2 is a fragmentary axial section of a two stage rotor;

Fig. 6 is an axial view of a rotor;

Fig. 7 is a section along line 7—7 in Fig. 6;

Fig. 8 is a fragmentary axial view of a rotor showing an alternate form of indentation;

Fig. 9 is a fragmentary section along line 9—9 in Fig. 8;

Fig. 10 is a fragmentary section along line 10—10 in Fig. 8;

Fig. 13 is a view in side elevation of one of the spools for spacing the rotor side plates.

An axial flow fluid rotor is characterized by rotor flow passages which extend in the general axial direction from an inlet at the front of the rotor to an exit at the rear of the rotor to discharge fluid rearward with an axial component of velocity. Thus the fluid flows across the trailing edges of the blades defining the rotor flow passages.

Figure 1:
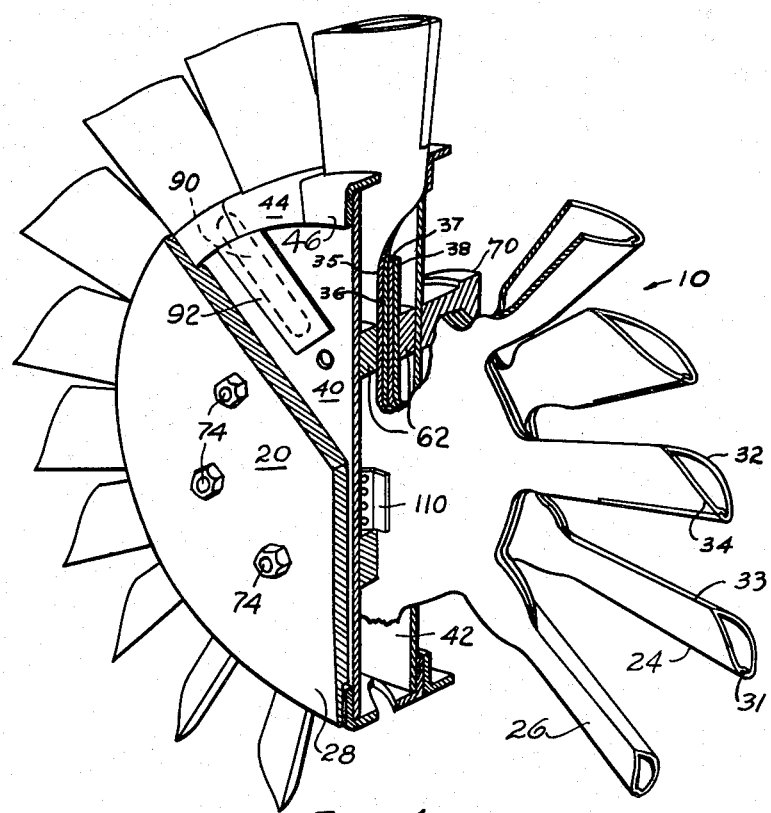
Fig. 1 is a perspective view of a rotor partly in section.

Referring now to the drawings Fig. 1 shows a fragmentary perspective view partly in section of a rotor assembly 10 according to this invention. In Fig. 2 there are shown two stages 12 and 14 supported on shaft 16 by the clamping plates 20 and 22.

Each stage is comprised of the plurality of blades 24 and 26 respectively and the hub structure 28 or 30 about which the blades are spaced peripherally.

As shown in Fig. 1 there are two sets of blades interdigitating with each other. The blade parts 32 and 34 forming the blades are integral with their respective blade supporting plates 35, 36, 37, 38. Side plates 40 and 42 and rim closures 44 enclose the blade supporting plates. The rim closures 44 extend between blades and between plates 40 and 42 to which they are fixed by the closure flanges 46 and 48.

The assembly of each stage is preferably soldered together in a furnace. The blade parts are soldered along the lapping surfaces 31 and 33 at the nose and trailing edges, respectively. The plates and rim closures are also soldered along their lapping surfaces.

Figure 3:
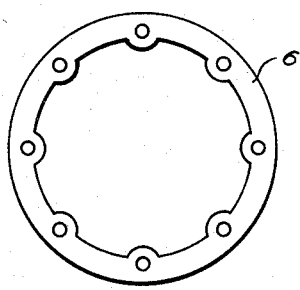
Fig. 3 is an axial view of a ring for joining the rotor stages.

The rotor stages are assembled by means of the clutch assembly 60. The rings 62 forming part of that assembly, shown also in Fig. 3, are positioned between the side plates 40 and 42 and the blade supporting plates as shown in Fig. 2.

Figure 4:
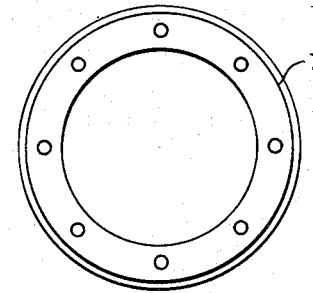
Fig. 4 is an axial view of a clutch element.
Figure 5:
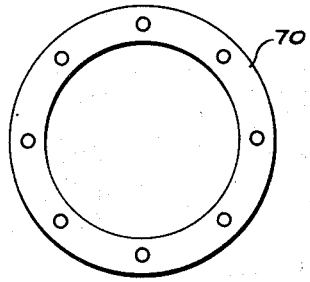
Fig. 5 is an axial view of another clutch element.

Between the stages are the annular clutch elements 70 and 72, also forming part of clutch assembly 60, the former fixed to stage 12 and the latter to stage 14. The bolts 74 pass axially through each rotor including the clamping plates, the rings 62, and the clutch elements which are shown in Figs. 4 and 5, the clutch assembly serving to center the rotors relative to each other.

The rings or annular members 62 and 70 are narrow and spaced outward from the axis of rotation by a distance of the order of one-half the rotor hub diameter to effectively support the thin sheets employed for the rotor disks. The inner radius of the annular elements to the inner circumferential surface thereof is several times greater than the radial width thereof.

The centrifugal stress from each blade is carried radially inward by the inner portions thereof to the annular members comprising rings 62 and the like to which the blades and side plates are bonded as by brazing or the like.

The bolts pull the clamping plates and clutch elements together. The driving torque is then transmitted from one rotor stage to the other by the shear stress in the bolts.

The driving torque is applied through the shaft 16 fixed in the hub 80 of the clamping plate 22.

Since the side plates are thin sheets of metal they are subject to a vibration wave which has radial nodal lines. These waves travel circularly about the axis of rotation and it is desirable to provide damping means to prevent them from assuming dangerous proportions.

Accordingly the side plates 40 and 42 have indentations or cavities 90 as shown in Fig. 6. These extend in the general radial direction. That is they preferably do not lie exactly along the radius but are pitched with respect to the local radial direction that is the radial direction at their respective localities. A cover plate 92 extends across the indentation and is bonded to the side plate on opposite sides of the indentation or cavity to carry stress thereacross.

As shown in Fig. 7 a damper 94 is fixed to the cover 92 at 93 and bears freely on the walls of the cavity formed by the indentation 90 and the cover 92 at 95. The damper has a length substantially as long as the indentation.

Since the indentation is pitched with respect to the radial direction centrifugal force tends to press the loop of the damper outward against the walls of the cavity causing friction to damp vibration of the plate.

Another form of damper is shown in Figs. 8–10. The indentation extends radially and the damper 100 is fixed to the cover 92 at 93 so that centrifugal forces in the direction 101 presses the free end 102 against the walls of the indentation. Two or more of these dampers are located within each indentation.

Figure 11:
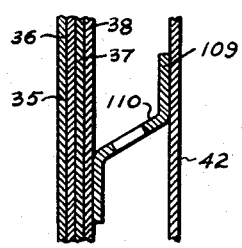
Fig. 11 is a fragmentary section along line 11—11 in Fig. 2.
Figure 12:
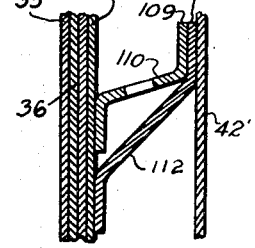
Fig. 12 is an alternate form of wave splitter.

The rotor stage is strengthened against axial load by sheet metal structure means comprising radially extensive members called the stiffeners 110 shown in Figs. 2 and 11. These stiffeners also act to lessen the effect of vibration since a vibration wave traveling in plate 42 is split with part going to the plates 35—38 and part proceeding circularly along plate 42. In some cases the splitting and dissipation of the wave will be better accomplished by an extra radially extensive member called a splitter 112 as shown in Fig. 12. It is to be noted that the radially extensive flanges 109 and 113 of the stiffeners 110 and splitters 112 respectively are fused to the side plates 38 and 42 and in the case of the splitter one of its flanges laps the flange of the stiffener. This splits the wave three ways and introduces a new phase relationship because of the greater lengths of paths. It is also important that the splitters extend between plates of different rigidity. In this case the combined plates 35—38 are stiffer than the side plate 42.

The hub means also includes the spools 122 which are placed at the center of the rotor between the side plates and the blade plates 35—38 to prevent vibration and to support the plates in the furnace during the bonding operation which is preferably some soldering operation like brazing.

While I have illustrated specific forms of the invention, it is to be understood that variations may be made therein and that I intend to claim my invention broadly as indicated by the appended claims.

What is claimed is:

1. In combination in an axial flow rotor, a hub structure including a radially extending side plate, a plurality of blades supported on said structure and spaced peripherally thereabout tending to produce vibrations in said side plate in operation, means joining each said blade to said plate, said plate having a cavity formed therein extending in a generally radial direction, a cover fixed to said plate and extending across said cavity defining an opposed wall portion thereof, and a vibration damper within said cavity attached to one wall of said cavity and frictionally engaging on another said wall thereof with a pressure varying with the rate of rotation of said rotor.

2. In combination in an axial flow rotor, a hub structure comprising a plurality of side plates spaced apart axially, a plurality of blades supported on said structure between said side plates and spaced peripherally thereabout tending to produce vibrations in said plates in operation, each said blade being joined to a said side plate, said side plates having at least one indentation therein extending in a generally radial direction, a cover plate extending across said indentation and bonded to said side plate on opposite sides of said indentation defining a cavity therein, and a vibration damper in said cavity attached to one of said plate walls and adapted to rub frictionally on another of said plate walls.

3. In combination in an axial flow rotor, a hub structure comprising a plurality of side plates spaced axially from each other, a plurality of blades supported on said hub structure between said side plates and spaced peripherally thereabout tending to produce vibrations in said plates in operation, each said blade being joined to a side plate, each said side plate having at least one indentation therein defined by spaced wall portions and extending in the generally radial direction but pitched with respect to the local radial direction, and a vibration damper positioned in said indentation adapted to frictionally bear against the spaced wall portions of said indentation under the action of centrifugal force to absorb the energy of vibration.

4. In combination in an axial flow rotor adapted for the interchange of energy with a fluid, a hub structure including a radially extending plate, a plurality of blades having radially inner portions supported on said hub structure and spaced peripherally thereabout with their trailing edges directed radially and tending to produce circular vibrations in said plate, and a radially extending member positioned between said plate and said inner portions of said blades, said member having flanges along opposite sides thereof with one of said flanges being fixed to said plate and another said flange being fixed to said inner blade portions to divert a portion of a circular wave vibration from one part of said hub structure to the other.

5. In combination in an axial flow rotor adapted for the interchange of energy with a fluid, a hub structure comprising axially spaced side plates extending radially, a plurality of blades supported on said hub structure spaced peripherally thereabout with their trailing edges extending radially and tending to produce vibrations in said plate, and a plurality of radially extending members positioned between and attached to said plates and to said blades respectively, said members being located closer together at one side thereof than at the other to damp said vibrations.

6. In combination in an axial flow rotor adapted for the interchange of energy with a fluid, a hub structure comprising axially spaced plates extending radially, a plurality of blades carried on said hub structure and having multiple thickness supporting wall portions between said plates, said blades being spaced peripherally about said rotor and having trailing edges directed radially tending to cause vibrations in said plates, and a radially extending member positioned between a said plate and said multiple thickness supporting wall portions, said member being fixed on its opposite sides to said plate and to said multiple thickness supporting wall portions, the multiple thickness of said wall portions causing damping of said vibrations.

7. In combination at least two rotor stages adapted for the interchange of energy with a fluid, each said rotor stage having a plurality of plates including spaced side plates and blade supporting plates positioned axially in tandem between said side plates, each said blade supporting plate having a plurality of blade parts integral therewith spaced peripherally thereabout, said supporting plates being arranged with said blade parts in registration one said part with another said part of separate said plates to form a blade, said parts forming a blade being bonded together, hub means for supporting said plates including annular members fixed between said spaced side plates and encircling the axis of rotation, and means including said annular members for supporting said rotor stages in relatively spaced axial positions and to transmit torque therebetween.

8. In combination in a rotor adapted for the interchange of energy with a fluid, a hub structure comprising a plurality of plates including side plates and blade supporting plates positioned axially in tandem between said side plates, each said blade supporting plate having a plurality of blade parts integral therewith spaced peripherally thereabout, said supporting plates being arranged with said blade parts in registration one said part with another said part of separate said plates to form a plurality of blades, said parts forming a blade being bonded together, and means joining said side plates to adjacent said blade plates including a plurality of radially extending members spaced peripherally and positioned between and fixed respectively to said side and said blade plates.

9. In combination in a bladed axial flow compressor rotor having a plurality of sheet metal walls tending to vibrate, said rotor having a plurality of cavities therein defined by spaced opposed wall portions of said sheet metal walls, a damper in a said cavity comprising a sheet having a portion curved about a line extending substantially radially, said portion being adapted to bear on said opposed wall portions of said rotor with motion relative thereto to cause damping of vibrations.

10. In combination in an axial flow compressor rotor, a hub structure comprising sheet metal side plates, a plurality of sheet metal blades spaced about said hub structure and extending inward between said side plates, rim closure means extending between said blades and said plates, and means located radially inwardly of said closure means and between said blades and said plates comprising radially extending sheet metal members having flanges on opposite sides thereof joining said blades to said plates.

11. In combination in an axial flow rotor assembly for interchanging energy with an elastic fluid, a plurality of rotors adapted to be assembled in axial tandem relation, each said rotor comprising a hub structure and a plurality of peripherally spaced sheet metal blades carried thereon for rotation about an axis, said blades upon rotation developing a substantial change in density and pressure of said fluid between the leading and trailing edges of said blades and developing substantial centrifugal forces at the roots of said blades, a rim closure supported on said hub structure and extending in the general axial direction at the roots of said blades from leading to trailing edegs thereof and from blade to blade to sustain said change in density and pressure, said hub structure including a sheet metal plate connected to the root ends of said blades to sustain said centrifugal loads thereof, an annular element fixed to said sheet metal plate and located radially between said axis and said rim closure, and means connecting said annular elements of adjacent said rotors to position them in said rotor assembly.

12. In combination in an axial flow rotor assembly for interchanging energy with an elastic fluid, a plurality of rotor stages adapted to be assembled in axial tandem relation, each said rotor stage comprising a hub structure and a plurality of peripherally spaced sheet metal blades carried thereon for rotation about an axis, said blades upon rotation developing a substantial change in density and pressure of said fluid between the leading and trailing edges of said blades and developing substantial centrifugal forces at the roots of said blades, a rim closure extending in the general axail direction at the roots of said blades from leading to trailing edges thereof and from blade to blade to sustain said change in density and pressure, said rim closure developing centrifugal load thereon, said hub structure including a sheet metal plate connected to the root ends of said blades and to said rim closure to sustain said centrifugal loads thereof, and means for assembly of adjacent said rotor stages including an annular element fixed to said sheet metal plate and having a radial width which is narrow relative to the maximum radius thereof.

13. In combination in a rotor adapted for the interchange of energy with a fluid, a hub structure comprising a plurality of plates including side plates and blade supporting plates positioned axially in tandem between said side plates, each said blade supporting plate having a plurality of blade parts integral therewith spaced peripherally thereabout, said supporting plates being arranged with said blade parts in registration one said part with another said part of separate said plates to form a plurality of blades, said parts forming a blade being bonded together, and an assembly element joining a said blade supporting plate to a said side plate and located radially outward from the axis of said rotor by a distance of the order of half the maximum radius of said hub structure.

14. In combination in an axial flow rotor adapted for the interchange of energy with a fluid, axially spaced side plates, a plurality of blade supporting plates positioned between said side plates, blades extending radially outwardly of said supporting plates and spaced peripherally around said rotor, circumferentially extending rim means fitting the contour of and located at the roots of the blades and fastened to said side plates for sustaining a pressure change in said rotor, and an annular member located inwardly of said rim means and outwardly of the axis of said rotor connecting said side plates and said blade supporting plates.

15. In combination in an axial flow rotor adapted for the interchange of energy with a fluid, axially spaced side plates, a plurality of blades spaced peripherally around said rotor, circumferentially extending rim means secured to said side plates at the roots of the blades, a blade supporting plate fixed to said blades extending radially inwardly of said rim means, and an annular member fixed to a said side plate and to said blade supporting plate at a radial position intermediate said rim means and the axis of said rotor.

16. In combination in an axial flow rotor adapted for the interchange of energy with a fluid, axially spaced side plates, a plurality of blades spaced peripherally around said rotor, circumferentially extending rim means secured to said side plates at the roots of the blades, a blade supporting plate fixed to said blades extending radially inwardly of said rim means, and a pair of annular members receiving said blade supporting plate therebetween and fixed to said side plates respectively.

17. In combination in an axial flow rotor for interchanging energy with an elastic fluid, a hub structure including a rotor disk of sheet metal, a plurality of peripherally spaced hollow blades carried on said hub structure for rotation about the axis thereof, said blades upon rotation at high speed developing a substantial change in density and pressure of said fluid between the leading and trailing edges of said blades and developing substantial centrifugal forces at the roots of said blades, a rim closure extending in the general axial direction at the roots of said blades from leading to trailing edges thereof and from blade to blade to preserve said change in density and pressure over the surface of said rotor, said disk being fixed to said rim closure and to the root ends of said blades to sustain said centrifugal loads thereof, and an annular element for transmitting rotor torque fixed to said disk and located radially between said axis and said rim closure, said annular element having an inner radius to the inner circumferential surface thereof which is several times greater than the radial width thereof.

References Cited in the file of this patent

UNITED STATES PATENTS

| 1,434,414 | Stoney | Nov. 7, 1922 |
| 2,181,592 | Sullivan | Nov. 28, 1939 |
| 2,258,459 | Marbach | Oct. 7, 1941 |
| 2,287,853 | Allardice | June 30, 1942 |
| 2,405,190 | Darling | Aug. 6, 1946 |
| 2,428,728 | Watson | Oct. 7, 1947 |
| 2,436,087 | Benson | Feb. 17, 1948 |
| 2,501,038 | Fransson | Mar. 21, 1950 |
| 2,537,739 | Chilton | Jan. 9, 1951 |
| 2,573,875 | Riddiford | Nov. 6, 1951 |
| 2,649,243 | Stalker | Aug. 18, 1953 |

FOREIGN PATENTS

| 6,859 | Sweden | Dec. 24, 1895 |
| 523,038 | Great Britain | July 3, 1940 |